US006345038B1

(12) United States Patent
Selinger

(10) Patent No.: US 6,345,038 B1
(45) Date of Patent: Feb. 5, 2002

(54) IMPROVING ACCESS TO CONGESTED NETWORKS

(75) Inventor: Craig Richard Selinger, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,140

(22) Filed: May 12, 1998

(51) Int. Cl.$^7$ ............................................... H04L 12/56
(52) U.S. Cl. ................. 370/230; 370/395.2; 370/395.21
(58) Field of Search ................................. 370/229, 230, 370/231, 235, 236, 252, 253, 468, 477, 395, 395.2, 395.21

(56) References Cited

U.S. PATENT DOCUMENTS

| 5,377,327 | A |   | 12/1994 | Jain et al. | 395/200 |
| 5,446,730 | A | * | 8/1995 | Lee et al. | 370/230 |
| 5,633,859 | A |   | 5/1997 | Jain et al. | 370/234 |
| 5,784,358 | A | * | 7/1998 | Smith et al. | 370/230 |
| 5,995,487 | A | * | 11/1999 | Weaver et al. | 370/230 |
| 6,091,709 | A | * | 7/2000 | Harrison et al. | 370/235 |
| 6,141,322 | A | * | 10/2000 | Poretsky | 370/231 |
| 6,212,562 | B1 | * | 10/2000 | Huang | 370/468 |

* cited by examiner

Primary Examiner—Wellington Chin
Assistant Examiner—Frank D Vong

(74) Attorney, Agent, or Firm—Robert Lieber; Richard A. Tomlin

(57) ABSTRACT

For a station in a data communication network having a predefined limit of congestion for handling data immediately undergoing transmission through the station, a system for improving service given to network users requesting new access services to support new transmissions through the same station while the predefined congestion limit is exceeded. This system contains: a first element for determining when the predefined limit is exceeded by existing data transmissions through the station; and a second element, responsive to requests for new access services that are received while the predefined limit is being exceeded for: concurrently processing the request for new service and reducing the quality of service (QoS) to selected users. The reductions in QoS generally have the effects of reducing the speed/priority of handling of data being transmitted to or from the selected users, and of freeing up of sufficient bandwidth to accommodate the requested new access services. The system includes a third element for restoring/upgrading QoS, to users whose QoS has been reduced, when bandwidth usage subsides to a level allowing for such restoration. This latter level is sufficiently less than the congestion limit to provide a hysteresis effect that delays actions by the third element sufficiently to prevent successive actions of said second and third elements from producing unstable fluctuations in the operation of the station. Arrangements are disclosed for applying the invention in a cable television network environment and in private network environments serving a single business enterprise such as a banking institution.

18 Claims, 5 Drawing Sheets

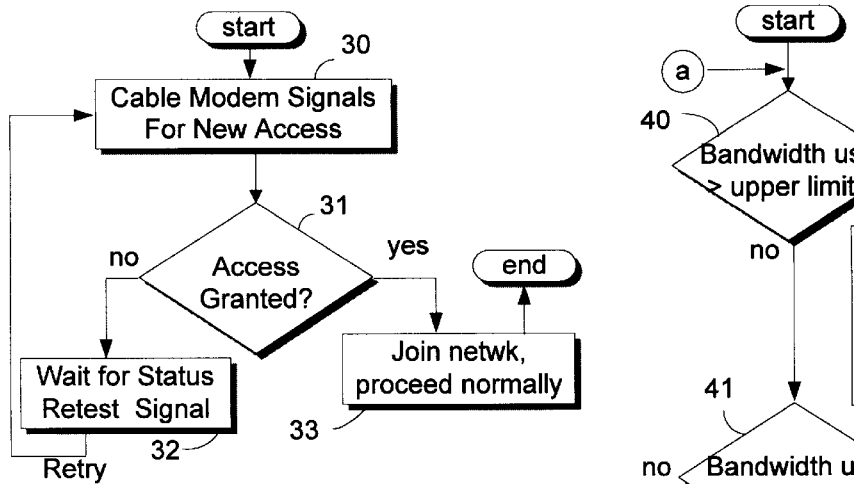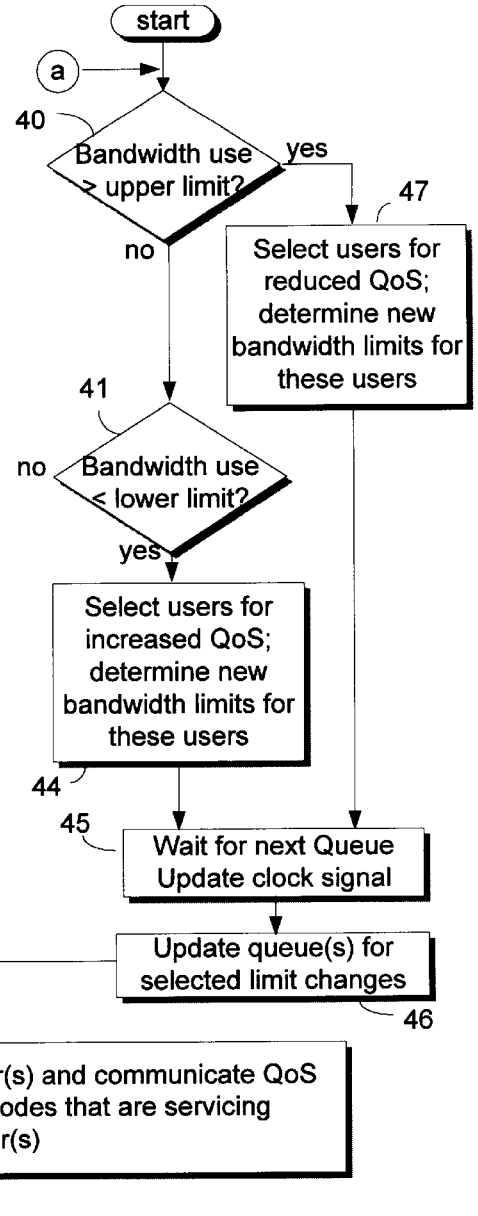

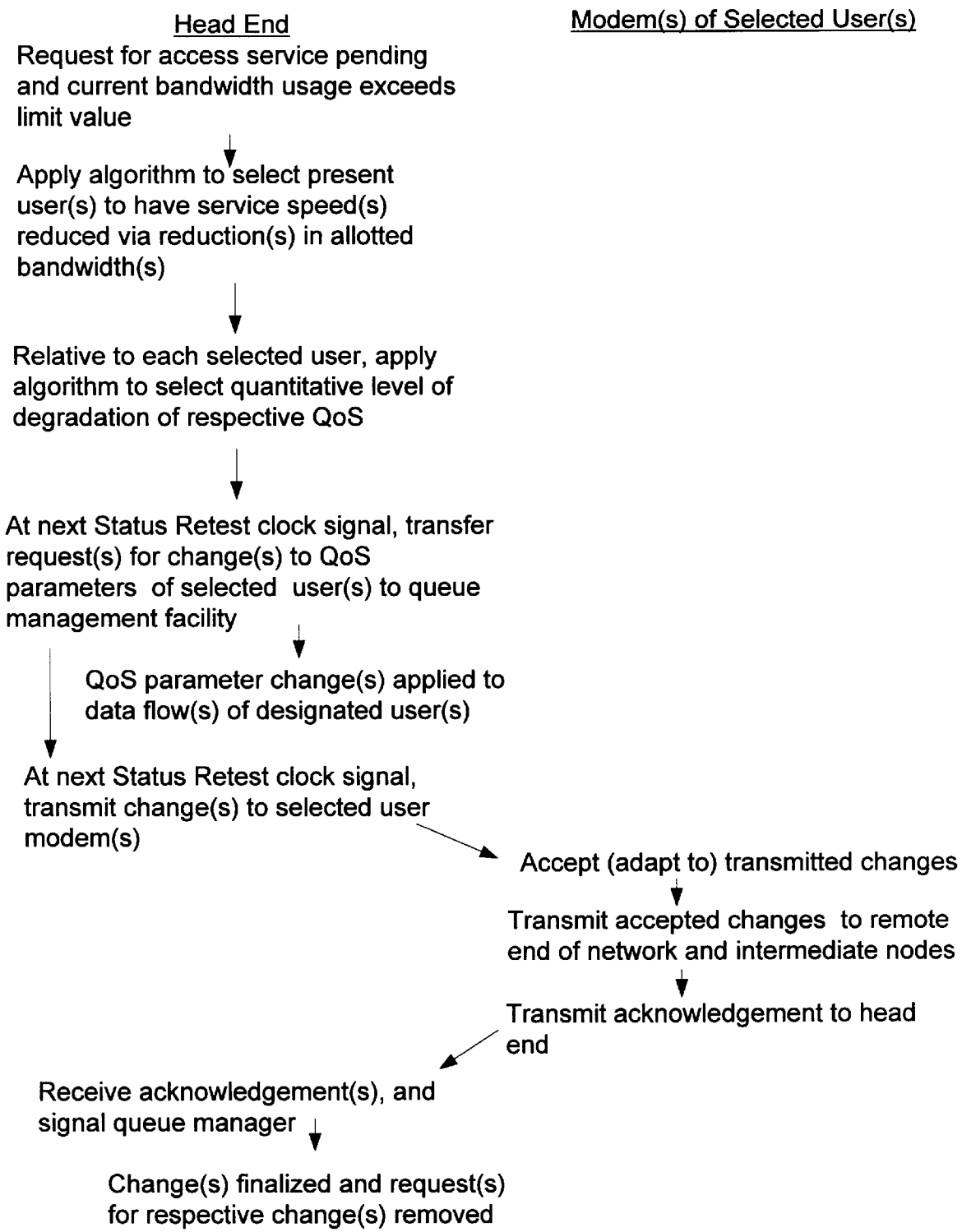

Figure 7
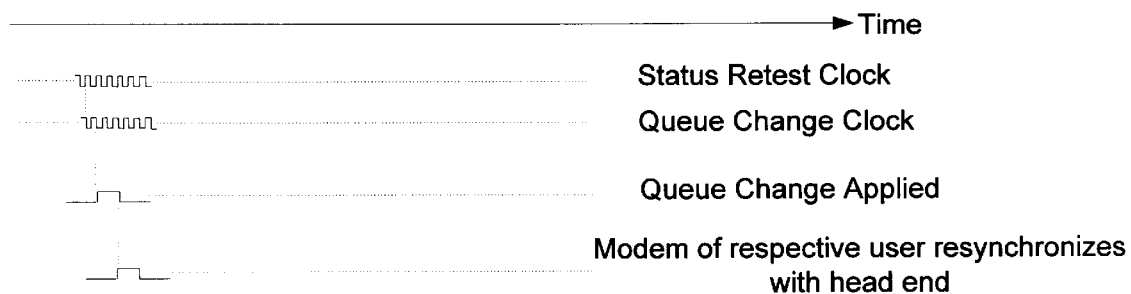
→ Time
Status Retest Clock
Queue Change Clock
Queue Change Applied
Modem of respective user resynchronizes with head end
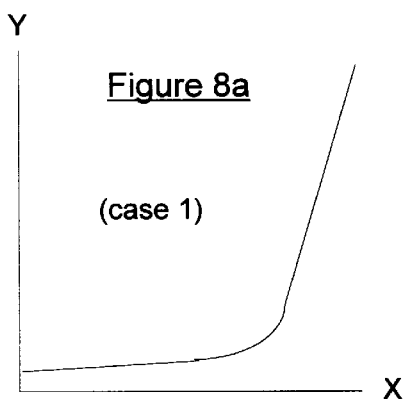
Figure 8a
(case 1)
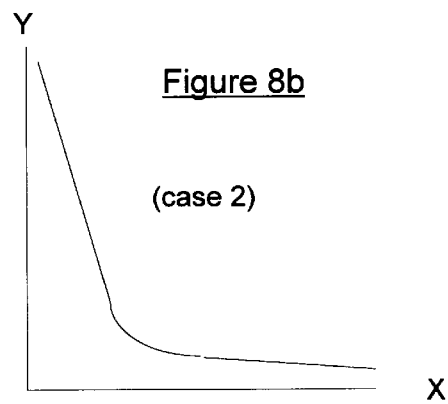
Figure 8b
(case 2)
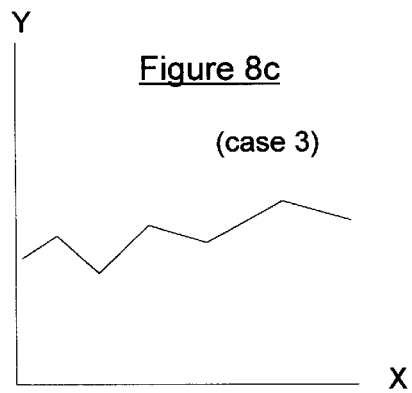
Figure 8c
(case 3)
Legend:
X = bandwidth demand per user
Y = Users per bandwidth

IMPROVING ACCESS TO CONGESTED NETWORKS

CROSS-REFERENCES TO RELATED APPLICATIONS

U.S. patent application Ser. No. 08/977,542 by C. G. Harrison et al, filed Nov. 25, 1997 and titled "Quality of Service Management For Packet Switched Networks", describes a system for providing network users with various guaranteed levels of quality of service ("QoS") that are intended to be maintained consistently during network operations.

DEFINITION OF TERMS

"Data communication" refers to transmission of digital information. Such information includes, but is not limited to, representations of pictures, sounds, typographic symbols, characters, and numbers. It also includes representations of combinations of these functions; for example, data representing televised sound, video, and closed captioned text. Such representations may have various formats; e.g. compressed and uncompressed formats.

"Access services" refers to services for handling data communications originated by users of a data communication network. A user may be either a person or automated apparatus operating at a station interfacing to the network. Automated apparatus, in the context just used, includes but is not limited to a communication-adapted personal computer or other communication device which can operate either attended or unattended to request access services for a respective station. Access services usually are provided in response to "access request" signals originated by network users.

A "station" in a data communication network is a facility for providing data communication access services. Network routers and administrative control centers are representative of stations in this context.

A network "route" is a data transmission path, through an arbitrary number of stations, between network end users sending and receiving a set of data.

"Peak capacity" refers to the maximum rate of data throughput that a station can sustain. Usually, it is a predetermined function of the aggregate bandwidth available at the station's network interfaces, and the station's internal capacity for storing and handling data.

A station is in a state of "congestion" when its rate of data throughput exceeds a predetermined "limit" near the station's peak capacity.

"Quality of Service" (QoS) pertains generally to bandwidth levels allotted to data sent by individual network users. Such allotments may be implemented by assigning ordered priorities of handling to user's data; e.g. by directing that data initially to different priority stages in a multi-stage queue. A network may contract with its users to provide various levels of QoS ranging from a lowest ("best efforts") level, wherein data packets of a respective user may encounter delays of arbitrary length at each station in a route, to a highest level that is intended to effect transmission of the data with minimal delays. At stations wherein data is transferred through priority-ordered queues, service applied to data of users subscribing to different QoS levels may be varied by directing the data initially into different priority-ordered stages of the queues.

BACKGROUND OF THE INVENTION

This invention relates to a system and method for improving access to congested networks. Presently, network stations accept requests for new access services until station traffic reaches a defined limit of congestion. Usually, this limit is determined as a function of performance limits of station components and transmission capacities (e.g. bandwidth) of media to which stations interface. When this limit is reached, requests for new or additional access services are rejected until traffic subsides to a level below the congestion limit. The above cross-referenced application by Harrison et al operates in this manner.

This practice, of rejecting new access requests when a station's traffic exceeds its congestion limit, may adversely affect rejected users under circumstances unacceptable to such users; for instance to users seeking to:

execute time-urgent electronic money transfers execute time-urgent electronic trades in stocks or other securities complete time-critical work assignments via the Internet (for example while at locations remote from regular business offices)

make time-critical reservations for airline flights, theater production, etc.

obtain immediately needed cash from an automated teller machine execute time-urgent transactions for a specific business; e.g. a bank or airline reservation firm The congestion limit may differ for different types of networks. For example, conventional telephone networks might be expected to experience peak traffic demands only at certain critical times; e.g. during certain holidays (Mother's Day, Father's Day, etc.) and at times of major events or disasters such as hurricanes, typhoons, etc. Thus, a properly designed telephone network should be able to handle all traffic at other times and its "limit of congestion" might be based upon traffic expected at such critical times. Similarly, data communication networks like the Internet might be expected to experience unusually heavy traffic loads at critical times. Hence, congestion limits for routers and otherstations in such data networks may be established in contemplation of traffic expected at such times.

SUMMARY OF THE INVENTION

The present invention seeks to alleviate inconveniences to network users caused by the foregoing practice of unconditionally rejecting requests for new or additional access services when traffic at a station receiving such requests is above a defined limit of congestion.

In accordance with this invention, network stations handling traffic exceeding their limit of congestion do not automatically reject requests for new or additional access services. Instead, such new requests are accommodated by degrading access services to selected elements of existing traffic. Users affected by such degrading actions should not be unduly dissatisfied with the resulting service—given to understand that such actions could also benefit them when they otherwise could be blocked from receiving new access services—provided that the periods of degradation are generally brief and that the degradation process is administered on a fair and uniform basis. Financial incentives also could be offered as consideration to users affected by degraded services during times of peak usage.

The degradation process is intended to be "graceful" and have minimal adverse affect on existing traffic. Thus, this process may be applied selectively to elements of traffic receiving a selected class or selected classes of access service. Also, it may be applied on an incremental basis so that degradation of service to an affected element of traffic increases gradually over time.

It is worth noting that degradation processes in accordance with this invention are easily adaptable to function efficiently in stations having different congestion limits, inasmuch as these degradation processes can be applied to selected elements of existing traffic in a manner consistent with the different limits. Furthermore, these degradation processes may also be combined with other procedures to minimize overall impact on the quality of station services. For example, they may be used with (augmented by) other procedures that selectively reject requests for new access services requiring handling of large amounts of data (e.g. multiple megabytes of data), and accept other requests for new access services involving transfers of lesser amounts of data; or even more selectively other procedures that reject only new service requests involving large data transfers at high levels of QoS while accommodating all other requests.

As noted above, degradation of access services to existing data traffic may be applied in a selective manner. Thus, for example, existing traffic subjected to degraded service might consist only of certain types of traffic—e.g. traffic of users entitled to a highest level of QoS or traffic of users currently sending large volumes of data at other than a lowest level of QoS, etc. Also, the degradation may be applied incrementally—e.g. by shifts to incrementally lower priority levels of QoS—resulting in transmittal of affected data at rates that are only incrementally reduced relative to "normal" rates applicable to uncongested conditions.

When volume of existing traffic falls below a predefined "restorations" limit lower than the congestion limit, downgraded services are restored to their "normal" levels (i.e. to levels contracted for by individual users and effectively guaranteed to respective users when station traffic conditions permit). The intent in requiring the restoration limit to be lower than the congestion limit is to provide a "hysteresis" delay in the restoration response, that guards against adverse effects on system productivity that could develop from overly quick responses to conditions representing fast swings between congested and uncongested states.

This restoration process also may be applied on an incremental basis so that degraded services are upgraded in a gradual and uniform manner.

Application of this service-adjustment technique to existing traffic of a congested network station is described with reference to a cable television distribution network. However, it will be understood that the same principles can be applied to virtually any network in which services to existing traffic are subject to being selectively degraded during periods of congestion and restored to prior levels when such periods end.

Application of the present technique is also described with reference to private networks maintained by a business enterprise or industry, using a typical private network for a bank enterprise as an example. This private network contains both leased telephone lines and a virtual private network (VPN) embedded in a public network (in the example, the Internet) with appropriate security features protecting transmissions against misuse by unauthorized individuals. VPN's are considered to be well known, and have been in use for over 10 years.

BRIEF DESCRIPTION OF THE DRAWINGS

FIG. 4 illustrates a foreground process for explaining how user interfaces to an existing cable network adapt for application of the present invention.

FIG. 5 illustrates a background process for explaining how head end stations of the same cable network adapt for this invention.

FIG. 6 is a chart for explaining the relative timing of synchronized actions between foreground and background processes mentioned above.

FIG. 7 is a chart illustrating timing signals relevant to above-mentioned foreground and background processes.

FIGS. 8a, 8b, and 8c are charts of various patterns of bandwidth usage at head end stations, for explaining how presently contemplated decreases in QoS can be effected without undue disturbance of overall station performance.

DETAILED DESCRIPTION

1. General Features of the Invention

This section is used to describe features of the invention that should be common to all network implementations. Other sections to follow will describe preferred implementations of the invention in cable TV networks and other broadband networks. It will be seen later that such implementations do not have any dependence on transmission media and transport protocols used in associated networks, and therefore that such implementations may be developed without specific consideration of media and protocols.

Figure 1:
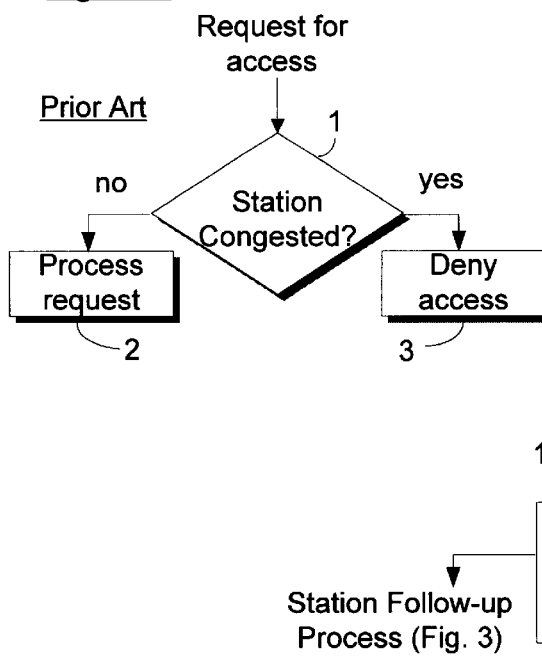
FIG. 1 illustrates, in a general context, prior art handling of requests for new access services at a network station when station data traffic exceeds a pre-established congestion limit.

FIG. 1—designated "Prior Art"—illustrates how routers, and other data transfer stations in existing networks, normally deal with congestion. Such stations have a mechanism for detecting when the volume of existing data traffic exceeds a predefined congestion limit. It is understood that such stations generally contain programmed devices—e.g. computers—that administer station processes, and that such processes per se are generally implemented by means of stored software and/or firmware program functions applied to respective devices. Therefore the mechanism for detecting when existing traffic exceeds the predefined congestion limit also may be implemented by such software and/or firmware. It should be understood however that any of the presently contemplated functions also could be implemented by discrete hardware (i.e. hardware not using a stored changeable program).

As implied previously, the congestion limit just mentioned is established as a function of the station's design and its output bandwidth. At a properly designed station, data traffic through the station should exceed this limit only at certain critical times (e.g. special or "prime" times of usage on any day, or on holidays, or during times of disasters, etc.).

Operations affected by conditions detected by the foregoing mechanism (the mechanism for detecting when existing traffic exceeds the predefined congestion limit) are suggested by the decision symbol at 1. As indicated at 2, when a request for new access service is received at a station whose congestion limit is not exceeded the request is accepted (i.e. the requested services are scheduled and associated data is transferred through the station). However, as shown at 3, when the limit is exceeded, such access requests are unconditionally rejected. When a request is rejected, the network user originating the request is effectively denied service and must repeat the request until station conditions allow acceptance (i.e. until existing traffic no longer exceeds the congestion limit).

As noted earlier, such unconditional rejection of new access requests may adversely affect respective requesting users—especially users requiring execution of time-critical functions—in a manner which could be intolerable to affected users.

Figure 2:
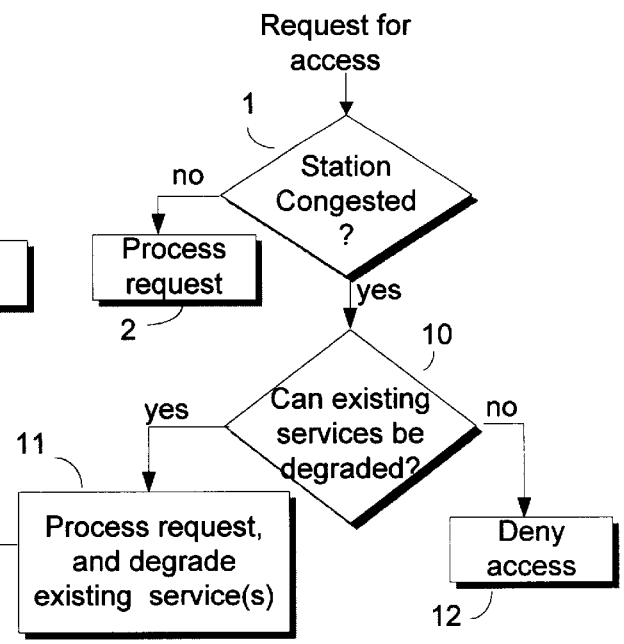
FIG. 2 illustrates presently contemplated handling of requests for new access services when a pre-established congestion limit is exceeded.
Figure 3:
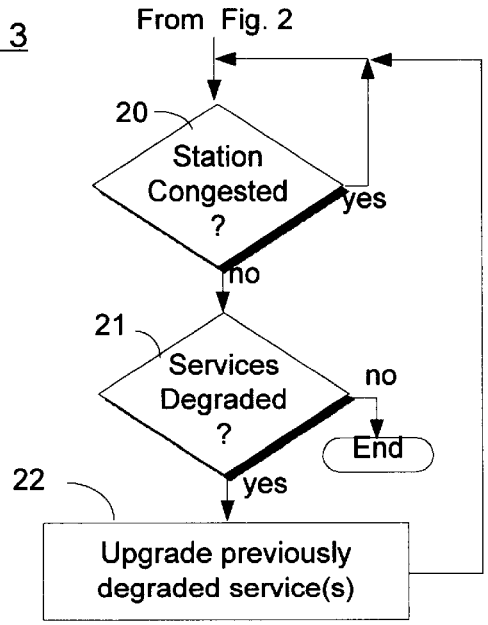
FIG. 3 illustrates restoration of presently degraded access services when data traffic conditions are suitable for such restoration.

FIGS. 2 and 3 show a system/method arrangement representative of the present invention considered in its broadest context.

In FIG. 2, as in FIG. 1, when a request for new access service is received the level of existing traffic is effectively compared to a predefined congestion limit (symbol 1), and the request is accepted (block 2) if the existing traffic load does not exceed the congestion limit (i.e. the requested new connection is established and desired access services are initiated). However, if the congestion limit is exceeded, the request for service is not automatically rejected.

Instead, as indicated at 10–12, the station determines if services to existing connections are subject to being degraded (decision 10). As used here, "subject to being degraded" is intended to connote that the present process of degradation may not be applicable to all elements of existing traffic (e.g. due to particular requirements of individual users), and therefore that there could be periods in which no elements of existing traffic would be eligible for degradation.

As shown at 11, when services to existing traffic elements are subject to being degraded (in the foregoing context), two actions may be instituted: (1) the new access request may be accepted (i.e. the required new access service may be scheduled), and (2) services to selected elements of existing traffic may be downgraded to free up sufficient bandwidth to enable the station to efficiently handle both the existing traffic and the traffic expected for the accepted new request. As indicated at the output of block 11, a follow-up procedure, shown in FIG. 3 and explained below, is used to restore/upgrade downgraded services.

As suggested at 12, when service to existing data traffic is not subject to being degraded, the request for new access may be rejected. Although this situation could occur in theory, likelihood of its actual occurrence is considered to be extremely small, inasmuch as it is expected that there will usually be a diverse mix of users receiving existing services at any time, and hence there should be little likelihood that all elements of a user mix serviced at any instant of time would consist of users objecting to any degradation of service.

FIG. 3 indicates a station follow-up process for conditionally upgrading previously degraded services. As shown at 20, no upgrading action is taken until the station is no longer congested. As indicated further at 21, no upgrading action is taken when all existing services are at normal levels. As shown at 22, when the station is no longer congested, previously degraded services are selectively upgraded.

Note that decisions 20 and 21, as presently contemplated, are intended to allow for a discrete delay, or hysteresis effect, in restoration of services to user traffic previously downgraded. The purpose of this is to prevent unstable thrashing effects that could result from overly fast swings above and below the station's congestion limit. This action is obtained by setting a restoration limit (a traffic level at which the restoration action is implemented) that is sufficiently lower than the congestion limit to provide the desired delay in restoration response. Thus, as a station's traffic subsides below the congestion limit, after having exceeded that limit, no restoration action is taken until the traffic level falls further, below the restoration limit. Consequently, actions associated with restoration of previously degraded services are delayed sufficiently to ensure e.g. that the station will not instantly become congested simply due to such restoring actions.

2. Preferred Implementation For Cable Television Networks

FIGS. 4 and 5 are used to describe a preferred implementation of the invention for contemporary cable television distribution networks.

Such networks presently have user interface nodes (e.g. at user residences, offices, etc.), grouped geographically in neighborhoods or building structures, with individual groups linked to "neighborhood head end" stations from which television programs and network access services are delivered to respective groups . Television program signals are usually delivered unidirectionally from the head end to respective user interfaces; although there are "pay per view" arrangements that require two-way signaling between user interfaces and head ends. Furthermore, some existing user interfaces in contemporary cable networks have "cable modem" devices, enabling respective users to receive access services by which data is transferable between respective users and remote stations of a network (a network potentially using other media besides cable) via respective head ends, thereby enabling respective users to link to various networks, including the Internet and other networks, and thereby obtain data distribution services between their neighborhoods and remote areas (as well as diversely equipped remote user stations) on a global basis.

Typical cable modem devices and head end data distribution facilities in use today are described in:
a) http://www.cabledatacomnews.com/ads/com21wp.htm (white paper on cable modem networks)
b) http://www.hybrid.com/PRODUCTS/bband ds.html (describes a cable broadband access system)
c) http://www.terayon.com/products/tera.html (another broadband access system)
d) http://www.cabledatacomnews.com/cmic1.htm (overview of cable modem technology)
e) http://www.web-china.com/1A/hfc.html (paper "Broadband: HFC, ATM & Wireless (Hybrid Fiber Coax. Async Transfer Mode)
f) "Overview of Broad-band Access Technologies", M. Gagnaire, Proceedings of the IEEE v. 85, n 12, December 1997, pp. 1958–1972
g) U.S. Pat. No. 5,528,582, "Network Apparatus And Method For Providing Two-Way Broadband Communications"

The implementation presently contemplated, for ensuring that users requesting new access services receive efficient responses to their requests while the network is congested, include changes to both user interfaces and head end facilities. Functions performed at user interfaces are modified to include a foreground process illustrated in FIG. 4, and functions performed at head end facilities are modified to sustain a background process shown in FIG. 5. Those skilled in the presently relevant arts will recognize that functions of the foreground process may be implemented either by software changes at computer equipment interfacing between users and their cable modems, or by changes to existing cable modems, or by introduction of new hardware between users and their cable modems. Similarly, it will be understood that functions of the background process may be implemented either by addition of software applications to existing head end computer servers or by discrete hardware where such servers are unavailable.

As seen at 30, in FIG. 4, the foreground process begins when the cable modem at a user station signals the respective neighborhood head end for access to transmit data. This "initial signal", when acknowledged by the head end, is followed by a data transmission request to be processed at the head end. The request effectively describes the length and form of a data transmission to follow the request. Timing of the head end's acknowledgment of the initial signal depends upon the instantaneous availability of the head end for processing the request, and the volume of data traffic currently being handled at the head end.

As shown at 31 and 32, if the head end is unable to process the request currently, the user's cable modem waits for a "Status Retest" clock signal and repeats the initial signal. Thus, it is understood, that the modem is not logically disconnected from the head end, in respect to such unanswered requests, as would be expected in prior art arrangements for handling comparable requests. These clock signals, generated at the head end, serve as a synchronizing reference for both the head end and user modems in a manner which will be explained below with reference to FIG. 7.

As suggested at 31 and 33, if the head end is immediately able to process the initial signal it presents the appropriate acknowledgment enabling the user interface equipment to present its request for new access and join (i.e. link to) the network.

The background process at the head end is illustrated in FIG. 5. At the start of this process, a decision 40 is made to determine if the current usage of available bandwidth at the head end does or does not exceed a predetermined upper limit. The upper limit is established as a function of the maximum transmission rate of the station hardware and transmission media to which the station interfaces, with allowance of a small safety margin to preclude excessive occurrences of errors that might otherwise be expected if station throughput is allowed to reach a limit of functionality. The safety margin or buffer also should allow for transfer of necessary or planned administrative communications in addition to user data.

If the limit is not exceeded, the process of blocks 41–46 is performed; whereas if the limit is exceeded, and one or more requests for new access services are pending, operations 47, 45, 46, 42, and 43 are performed in succession. For this discussion, it is assumed that data flow through the head end is handled through a priority-ordered queue, under control of a "queue manager" entity (circuit or software) that determines entry-positions of data into the queue and movement of data between queue stages (refer e.g. to the co-pending patent application of C. G. Harrison et referenced above). Thus, the level of QoS applied to data of specified user can be varied by appropriate signals or instructions to the queue manager.

In the operations starting at 47, one or more users currently receiving service at a priority level higher than other users are selected to have their levels of QoS temporarily reduced/downgraded (operation 47); i.e. to have the speed of transfer of their data effectively reduced. At an appropriate clock signal (operation 45), service to each selected user is downgraded by a signal or instruction to the above-mentioned queue manager (operation 46). These operations are followed by operations 42–43 relative to the selected user(s) to enable remote modems of that-those user(s) to resynchronize to the reduced QoS/speed.

The operations starting at 41 begin with a determination 41 as to whether or not current bandwidth usage is less than a predefined lower limit which is discretely less than the upper limit. While current bandwidth usage is not less than this lower limit, operations 42–43 are performed without effect on user data or modems, since no users have been selected by immediately preceding operations. However, when current bandwidth usage is less than the lower limit, QoS levels of one or more selected users—specifically, users whose QoS levels have been decreased by prior application of operation 47—is/are increased by operations 44–46, after which operations 42–43 are performed relative to the selected user(s) to enable remote modems of the selected users to synchronize to data transfer rates associated with the increased levels (the somewhat redundant term "resynchronize" is used in the drawing to connote this synchronization to different transfer rates).

The lower (restoration) limit used in decision 41 is sufficiently less than the above-mentioned upper (congestion) limit to produce a hysteresis effect delaying restoration actions so as to guard against adverse effects associated with responses to overly rapid or frequent swings in station traffic levels above and below the congestion limit.

The chart in FIG. 6 shows how the above foreground and background processes inter-relate in time relative to data transmissions of users affected by presently applied reductions in bandwidth allocations associated to respective allotments of their QoS service levels. Although this chart does not specifically describe the time interactions associated with restorations of bandwidth (QoS) allocations to levels originally assigned to such affected users, the nature of such interactions should be apparent from the information given in this chart.

The left-hand column of this chart indicates background operations performed in time succession at the head end, and the right-hand column indicates resynchronizing functions performed by cable modems of users having their QoS parameters instantly reduced, as parts of respective foreground processes.

As shown in the left column, when one or more requests for new access service is/are pending and the head end is in a congested state (current bandwidth use exceeds a predetermined limit), the head end system (e.g. a computer server with a program application for dynamically varying QoS in the manner presently contemplated) performs first and second selection algorithms; the first to select one or more users to have respective levels of QoS (i.e. service speed) reduced, and the second to select quantitative levels of reduction for respective levels.

At a next Status Retest clock signal (see discussion below of FIG. 7), selected reductions in QoS are applied to data being transmitted from or to selected users.

As noted above, in systems where speed of service is established by entry positions of data into a priority-ordered queue, QoS applied to data sent by any user may be varied by varying the entry position of respective data into the queue. Typically, responsibility for controlling operations in such queues is assigned to queue manager entities (programs or circuits) designed for that purpose. An example of this type of queue arrangement is discussed in the above-referenced co-pending patent application by Harrison et al. Details of operations in such queues are not considered relevant to this invention.

Thus, assuming for this discussion that speed of data transfer at the head end is determined by positioning of respective data in a priority-ordered queue run by a queue manager entity, it is apparent that implementation of the selected reductions could be accomplished in this instance by transfer of appropriate request functions (signals or program command) to the queue manager entity. These functions should identify data of selected users and the quantitative level of reduction in QoS to be applied to that data; with the resulting effect that respective data are lowered in relative priority (i.e. assigned a lower priority entry position into the queue) by an amount defined quantitatively.

After this reduction in priority has been set up, at a next clock signal discussed further below, signals are transmitted to the selected user(s) indicating their changed transfer rates.

Users receiving these signals are required to adapt to these changes by synchronizing to a reduced transfer rate relative to the head end, by transmitting data packets effectively notifying all routing stations in the routing path of their current data transmissions of the changes (thereby enabling each routing station to adapt to the slower rate, and by returning an acknowledgment signal to inform the head end of their actions. Although contemporary cable networks generally require user cable modems to synchronize periodically, to ensure that communications between users and head end remain consistently synchronous at a generally fixed average rate, it is noted that presently contemplated synchronization would have the additional effect (that is, in addition to effects normally attributable to synchronization) of adapting such communications to be synchronous at different average rates.

Upon receipt of acknowledgments from affected users, the head end signals the queue manager, causing the latter to finalize changed queue parameters and remove request functions calling for those changes.

Similar interactions occur when the head end increases QoS levels to users affected by prior decreases (refer to boxes 44-46 in FIG. 5). That is, the head end transfers appropriately timed and formed request functions indicating the selected user(s) and the quantitative level of QoS increase to be applied. Affected users are then notified and their cable modems resynchronize to the designated higher speeds.

Timing signals relevant to the foregoing processes are shown in FIG. 7. For proper operation of this invention, it is important to have a timing scheme that insures that processes affecting data handling do not interfere (e.g. so that attempts to read and write to a common data point do not coincide in time), and thereby create unstable and potentially indeterminate conditions. For this purpose, it is required that all presently relevant processes synchronize via a clocking method ensuring serial execution of operations that are intended to be serially executed. More specifically, referring to FIG. 7, "status retest" and "queue change" clock signals, associated respectively with detecting and reacting to changes in status, are discretely out of phase. The illustrated phase difference between these clocks—i.e. 180 degrees—is not considered significant, since larger or smaller phase differences would be expected to yield equivalent end results. For that matter, the exact form of synchronization clocking—leading edge triggering, lagging edge triggering, or level triggering—is not considered significant in respect to synchronization objectives of this invention.

The status retest clock is timed to coincide with stable states immediately subsequent to queue data transfer events associated with reading and writing of data into and out of the head end's queue, as well as shifting of data between queue priority stages. The queue change clock is timed to ensure that instructions to change queue handling parameters are delivered to the queue between data transfer events. The status retest clock also provides a time reference for signal transfer events conducted between user cable modems and the head end; see e.g. block 32, FIG. 4, and the "transmit changes" action shown in FIG. 6. Thus, as indicated in FIG. 7, signals respectively timing application of change instructions to the queue's head end (the "queue change applied" signal), and transfer of corresponding "resynchronizing" indications to modems of users affected by respective changes, are discretely phased relative to each other by virtue of the phase difference between successive status retest and queue change clock functions. This indication implicitly suggests that queue changes affecting a plurality of users would invariably be applied in a sequential manner, and that associated synchronization functions of modems of affected users would be correspondingly serialized. Further implicit in this is the fact that user modems may have different designs with different capabilities in respect to ranges of data transfer rates.

FIGS. 8*a*, 8*b* and 8*c* indicate various scenarios of traffic load patterns, at a head end station or any other data routing station in the network, in which the present invention could be beneficially utilized. Each chart is a graph of bandwidth demand per user versus number of users per unit of available bandwidth. It is assumed that each pattern indicated would persist for substantial intervals of time.

In the situation of FIG. 8*a*, there are few users using low bandwidth levels and a majority of users using higher bandwidth levels. This could occur for instance when children are at school and businesses are busy (i.e. it is unlikely to occur during the middle of a school year or during vacation times). In this situation, reducing bandwidth allotted to low bandwidth users, when station traffic exceeds the congestion limit, would be of little help in freeing up sufficient bandwidth to accommodate requests for new access services since most such requests would be from users of high bandwidth levels. Thus, the most effective action in this situation would be to slightly reduce bandwidth levels allotted to some of the highest bandwidth users.

The situation in FIG. 8*b* is the opposite of that in FIG. 8*a*. Here, the majority of existing users and users requesting new access services would have low bandwidth requirements. This situation could occur for instance during evening hours when businesses are closed and many home users are active. Hence, the most effective reaction to congestion in this instance would be to slightly lower bandwidth allotted to either many users at the low end or a few users at the high end.

FIG. 8*c* shows a situation that might typically occur during late afternoon hours of normal non-vacation days; when children are home from school and businesses are still open. Here there is a roughly even distribution of low and high bandwidth users (both existing users and those requesting new access services). The appropriate reaction to congestion here is to lower bandwidth allotments in both segments proportionately; i.e. apply small changes to low end users and larger changes to high end users.

3. Implementations For Other Networks

The invention as described is easily adapted to apply to networks that interface to end users through media other than cable (e.g. conventional dial-in telephone networks, networks with direct radio links to end users, etc.).

A. Application to Conventional Dial-in Telephone Networks

Conventional dial-in telephone networks link to end users via conventional telephone modems or special lines (lines carrying ISDN service, T1 lines, etc.). Other data networks such as the Internet may also link to end users via conventional telephone links between Internet Service Providers (ISP's) and end users.

Switch exchanges in the telephone networks are generally designed to be able to serve only a rather small fraction of all end users of the respective exchange/station at one time.

In simpler terms, the design of an exchange serving n end users with conventional modems, each modem having an operating speed of at most 56 k, would have a maximum bandwidth of m times 56 k, where m is a small fraction of n. There are many reasons for this. For instance, some users may have modems operating at maximum speeds of 28 k or less, and existing FCC standards do not permit telephone networks to support modems at rates exceeding 56 k. Also, stations operating at 800 telephone numbers, and/or stations interfacing to users making credit card calls, may have other bandwidth restrictions based on those factors.

Thus, it is not uncommon today for end users of the Internet, who use dial-in telephony to connect to ISP's, to encounter busy signals or to receive what seems to be a valid modem connection followed by an idle interval of indefinite length and an apparent disconnection. These effects typically are caused by congestion conditions at ISP stations, and it should be apparent that incidence thereof would be significantly reduced by use of the present invention; i.e. by having the stations incrementally reduce rates of transmission of selected existing users to offset congestion. Such selective rate reductions would require adaptation of such stations (via hardware and/or software) to support a background process of the type described above for cable head end stations. In that process, signals sent from the station, to modems of selected users currently receiving services, would condition respective modems to synchronize to new data clocking rates lower than those currently in use. As a result, aggregate use of station bandwidth would instantaneously decrease, permitting new access services to be undertaken.

Similarly, when volume of station traffic subsides sufficiently, end user modems previously synchronized to reduced data transfer rates could be signaled to resume operating at higher rates.

B. Application to Other Networks

Application of the invention to networks other than dial-in telephone networks, and cable distribution systems, may best be understood by considering types of networks that are presently in formative stages of development; for example, so-called networks of networks[1]. In such systems, networks of ISP's hook together to effectively share resources and thereby obtain access to larger amounts of bandwidth than are available to individual ISP's. Users dialing in to one ISP would effectively gain access to that and other ISP'S, via a high speed internal network deployed by the cooperating ISP's. In this scenario, as usage of available bandwidth reaches a predefined congestion limit, the cooperating ISP's would inter-act to reduce bandwidth allocated to selected dial-in users both at their dial-in interfaces to single ISP's and across the internal network links deployed by the cooperating ISP's.

[1] A) http://www.ipass.com; B) "GRIC To Boost VPN (GRIC Communications, Global ISP Roaming Network)", by S. Berinato, PC Week n5, v15, Feb. 2, 1998, pg. 22.

4. Usage in Private Networks

A. General

Business enterprises, or industries, that can benefit from enhanced availability of private data networks resulting from applications of this invention include at least:

insurance—via e.g. enhanced access of mobile assessors and other field employees to remote computers during periods of network congestion health care—via e.g. enhanced access of ambulance crews and other field personnel to remote offices banking—via e.g. enhanced access of branches to remote central computers securities firms—via e.g. enhanced access of branches to stock trading centers government—via e.g. access of military to centers of communication airlines and FAA regulators—via e.g. enhanced access to communication centers industries employing network of networks techniques as described above industries employing virtual private network (VPN) facilities.

B. Specific Example

A specific example of how such private networks can beneficially use the present invention is explained with reference to FIGS. 9 and 10. In this example, a private network maintained by a typical banking enterprise is illustrated and discussed. However, it will be apparent that private networks of other enterprises could easily be adapted to use the invention in a similar manner.

Figure 9:
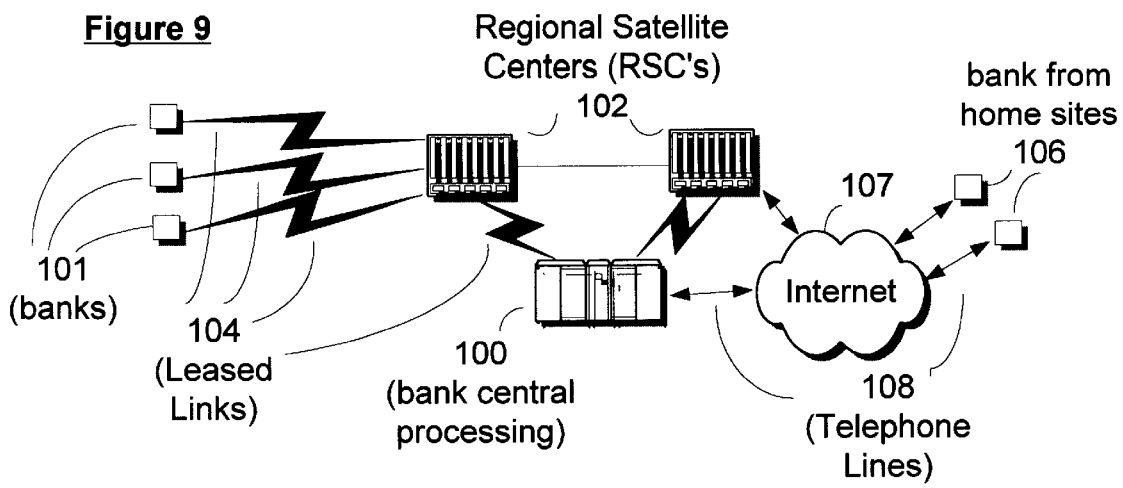
FIG. 9 provides a simplified view of an exemplary private network maintained by a banking enterprise.
Figure 10:
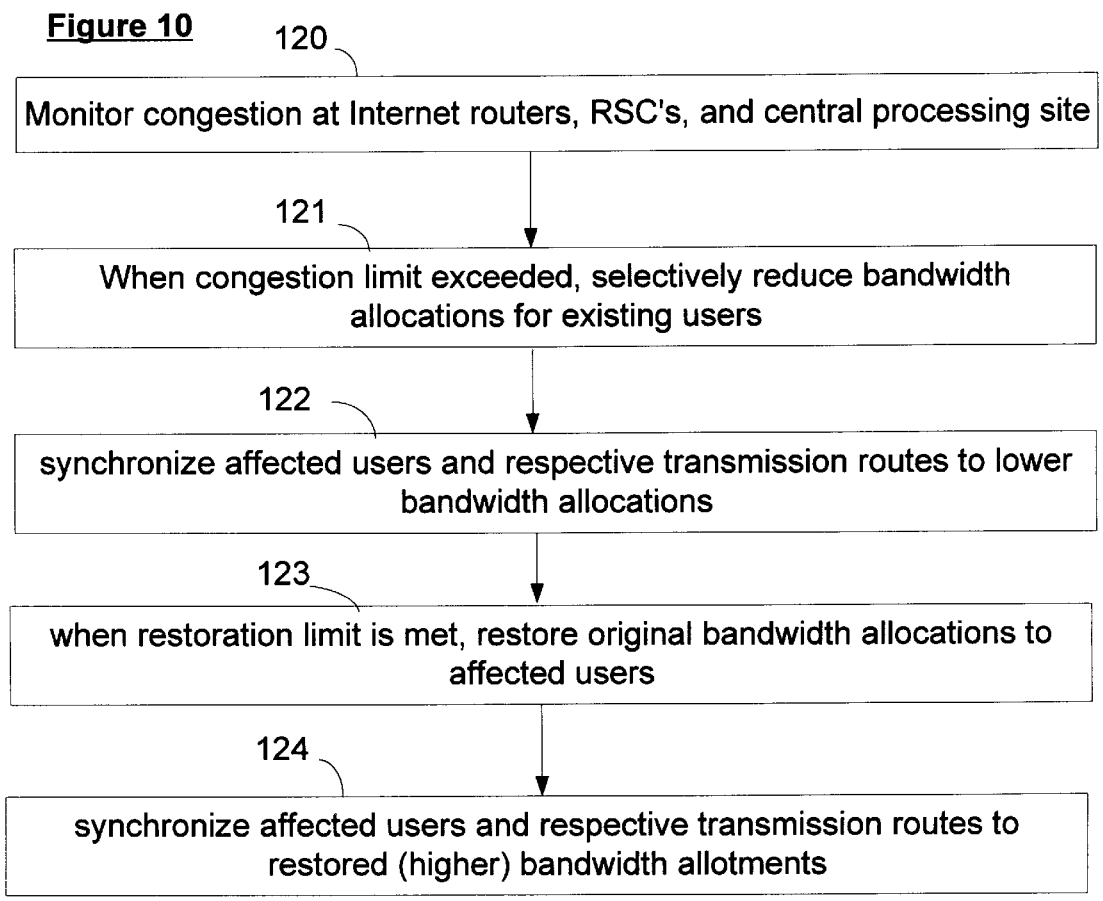
FIG. 10 is a flowchart explaining application of the present invention to the network of FIG. 9.

FIG. 9 provides a simplified view of the just mentioned private network maintained by a banking enterprise, and FIG. 10 is a flowchart providing a simplified overview basis for explaining how the invention can be applied to the network shown in FIG. 9.

In FIG. 9, central processing site 100 exchange data with bank branches 101 through regional satellite centers (RSC's) 102 and leased lines 104. Lines 104 are generically designated "links" since they could be implemented either on conductive media or as channels on radio links. Backbone network links to customer home sites 106, extending through the Internet shown at 107 and ordinary telephone lines 108, are used to support "bank at home" processing transactions. Preferably, these backbone links are implemented as virtual private networks (VPN's) that are embedded in the Internet but isolated from otherpublic transmissions by data security formats associated with useful VPN's. These links are used for connecting either site 100 or the RSC's 102 to the customer home sites. They also may be used to connect the central site to the RSC's, the RSC's to each other, and bank branches to the central site and RSC's. Communications between central site 100 and bank branches 101 may be either direct (direct data packet transfers routed through the RSC's but otherwise not processed at the latter) or indirect (data packet exchanges that are processed by the RSC's and forwarded later to either the central site or branches).

In general, leased lines are considerably more expensive to use than VPN's; hence the motivation for business enterprises to substitute VPN's for leased lines where that is feasible. However, VPN's may have considerably less bandwidth than leased lines, and therefore may reach states of congestion more readily than leased lines.

A typical data transmission format used in such networks is that used in the Transaction Processing Facility (TPF) commonly supported by International Business Machines Corporation and other business enfities. TPF is an operating system designed to efficiently handle very large volumes of data traffic, and for that purpose it contains a minimized structure that does not allow for automatic correction of transmission errors. Instead, senders infer errors from absence of acknowledgments and respond to such by retransmissions of the unacknowledged data.

In this type of environment, it is very easy for portions of the network (particularly, VPN branches) to reach a state of escalating traffic activity in which requests associated with retransmissions could cause not possibly be accommodated without the present invention, and in fact a state leading to potential crashes of the system. When the system crashes, it must be re-booted at each affected site, and then some or all of the data held in system queues prior to the crash would be lost. Thus it is realized that in this type of network environment, data critical to operations of the affected business enterprise could be irretrievably lost. Consequently, use of the present invention in this environment is expected to drastically reduce the frequency of operating system crashes and the loss of data that might result therefrom.

The flowchart in FIG. 10 provides a simplified basis for explaining how the invention is applied in such network environments. As suggested at 120, traffic levels are is monitored at all processing and transmission routing nodes in the network; that is, at the central site, the RSC's, the bank branches, and any Internet servers and/or routers maintained by the bank enterprise.

As suggested at 121 and 122, when monitored activity at a node station is detected to exceed a predetermined congestion limit, the respective station acts to: (a) reduce bandwidth allocations for selected current users of station services; and (b) synchronize transmission sources of affected users, as well as routing nodes handling respective transmissions, to operate at rates commensurate to the reduced bandwidth allocations.

Conversely, as indicated at 123 and 124, when monitored activity subsides to below a predetermined restoration limit (which, as described earlier, is discretely less than the congestion limit so as to introduce suitable hysteresis delays in the requisite response), actions are taken to: (a) restore bandwidth allocations of the same affected users to rates appropriate to their original service status; and (b) synchronize respective transmissions of such users and their transmission routing nodes to the restored rates.

It should be readily apparent that the same arrangement could easily be adapted to beneficially serve other business enterprises; e.g. an enterprise managing airline ticket reservations. Although such other enterprises might have different data transmission requirements, and have networks reaching states of congestion at different times than banks, the principles of adaptation for the invention are the same for all.

What is claimed is:

1. For a station providing network access services to multiple users of a data communication network, said station having a predefined limit of congestion for handling data concurrently undergoing transmission through said station, a system for improving access to said network for users requesting new access services when said predefined limit of congestion is exceeded due to services currently being provided at said station; said system comprising:

a first element for producing mutually exclusive first and second indications representing states of congestion at said station in respect to data undergoing transmission through said station for users of said network currently receiving said network access services; said first indication being activated only when said predefined limit of congestion is exceeded by said data undergoing transmission; said second indication being activated when said data undergoing transmission is at a level less than said predefined congestion limit; and a second element for controlling delivery of said network access services to users of said network; said second element being responsive to said first indications and coinciding requests by users of said network for new access services for concurrently:

enabling new access services to be provided in response to said requests, and a. causing a reduction in the rate of transmission of data currently undergoing transmission through said station; said reduction being sufficient to enable said station to effectively handle both all of the data currently undergoing transmission through said station and data newly transferred to said station in response to acceptance of said requests;

said second element being responsive to said second indications to increase the rate of transmission of data to which said reduction in the rate of transmission has been applied; and activation of said second indication being timed relative to deactivation of said first indication in a manner ensuring that successive reductions and increases in said rate of transmission of data occur in a manner consistent with stable and efficient operation of said station.

2. A system for improving network access in accordance with claim 1, wherein said data to which said reduction and increase are applied is data of selected current users of said station's services; which selected users may be less than all of the users currently receiving said services.

3. A system in accordance with claim 2 wherein said selected users of said station services are selected by said second element in accordance with predetermined criteria.

4. A system in accordance with claim 3 wherein said predetermined criteria are based on Quality of Service (QoS) normally allocated to and expected by respective selected users when said predefined congestion limit is not currently exceeded.

5. For a station providing network access services to multiple users of a data communication network, said station having a predefined limit of congestion for handling data concurrently undergoing transmission through said station, a system for improving access to said network for users requesting new access services when said predefined limit of congestion is exceeded due to services currently being provided at said station; said system comprising:

a first element for producing mutually exclusive first and second indications representing states of congestion at said station in respect to data undergoing transmission through said station for users of said network currently receiving said network access services; said first indication being activated only when said predefined limit of congestion is exceeded by said data undergoing transmission; said second indication being activated when the rate of handling of said data undergoing transmission is at a level less than a rate associated with said predefined limit of congestion; and a second element for controlling delivery of said network access services to users of said network; said second element being responsive to said first indications and coinciding requests by users of said network for new access services for concurrently:

b. enabling new access services to be provided in response to said requests, and c. causing a reduction in the rate of transmission of data currently undergoing transmission through said station; said reduction being sufficient to enable said station to effectively handle both all of the data currently undergoing transmission through said station and data newly transferred to said station in response to acceptance of said requests;

said second element being responsive to said second indications to increase the rate of transmission of data to which said reduction in the rate of transmission had previously been applied;

activation of said second indication being effectively timed relative to deactivation of said first indication in a manner ensuring stable operation of said station; and wherein said station has a predefined restoration limit different from said predefined congestion limit, said predefined restoration limit being used to control activation of said second indication and being associated with a level of data traffic that is discretely less than the level of data traffic associated with said predefined congestion limit, and wherein said first and second indications are respectively activated only when the rate of handling of said data undergoing transmission is respectively greater than the rate of data handling associated with said predefined congestion limit and less than a predetermined rate associated with said predefined restoration limit; the difference between said predefined congestion and restoration limits being sufficient to produce a hysteresis effect ensuring that successive decreases and increases in rates of transmission of said data currently undergoing transmission are consistent with stable and efficient operation of said station.

6. A system for improving network access in accordance with claim 5, wherein said network includes a cable television distribution network, said station is located at a head end control center of said cable television network, and said users of access services at said station are users of said cable television network having cable modems that are linked directly to said head end control centers for transmitting data to and from said station in synchronism with variations in rates of data transmission applied by said second element to data transmitted for respective said users.

7. A system for improving access to a cable network in accordance with claim 6 wherein:

said station at said head end control center is adapted to provide said directly linked cable modems of said users with signals indicating variations in data transfer rate applied to data currently being transmitted for respective users; and said cable modems of said respective users are adapted to respond to said signals indicating rate variations to synchronize to revised rates of transmission indicated by said signals.

8. A system in accordance with claim 7 wherein said data currently undergoing transmission is transmitted through routes extending through stations remote from said head end center, and said user cable modems have associated therewith means enabling respective modems to provide respective remote stations with signals indicating said variations in data transfer rate when said signals indicating variations in data transfer rate are provided to respective user modems by said station at said head end center; said signals provided to said remote stations enabling said remote stations to synchronize to respective revised rates of transmission of data being sent by respective users.

9. A system in accordance with claim 5 wherein said station is part of a private network serving a business enterprise.

10. A system in accordance with claim 9 wherein said private network includes a virtual private network embedded within a public network.

11. A system in accordance with claim 10 wherein said public network is the Internet.

12. For a station providing network access services to multiple users of a data communication network, said station having a predefined limit of congestion for handling data concurrently undergoing transmission through said station, a method of improving access to said network for users requiring new access services when said congestion limit is exceeded due to services currently being provided at said station; said method comprising:

producing mutually exclusive first and second indications representing states of said station in respect to data currently undergoing transmission through said station; said first indication being produced only when said predefined limit of congestion is exceeded by said data currently undergoing transmission, and said second indication being produced only when said data currently undergoing transmission is at a level discretely below said predefined congestion limit; and allowing for new access services to be provided to said users, while said congestion limit is exceeded by the level of said data currently undergoing transmission, by:

a. reducing the rate of transmission handling of a selected portion of said data currently undergoing transmission when said first indication is produced; and b. increasing the rate of transmission handling of said selected portion of data currently undergoing transmission when said second indication is produced following a deactivation of said first indication;

wherein activation of said second indication is effectively timed relative to deactivation of said first indication in a manner ensuring stable operation of said station.

13. A method of improving network access in accordance with claim 12 comprising:

selecting, as said portion of data, data currently being transmitted by selected users of said station.

14. A method in accordance with claim 13, wherein users of said station are normally guaranteed various different levels of quality of service (QoS) when said first indication is not produced, wherein said selected users are chosen as a function of their respective normally guaranteed levels of QoS, and wherein said step of reducing the rate of transmission handling effectively reduces QoS levels currently being provided to said selected users.

15. For a station providing network access services to multiple users of a data communication network, said station having a predefined limit of congestion for handling data concurrently undergoing transmission through said station, a method of improving access to said network for users requiring new access services when said congestion limit is exceeded due to services currently being provided at said station; said method comprising:

producing mutually exclusive first and second indications representing states of said station in respect to data currently undergoing transmission through said station; said first indication being produced only when said predefined limit of congestion is exceeded by said data currently undergoing transmission, and said second indication being produced only when said data currently undergoing transmission is at a level discretely below said predefined limit of congestion; and allowing for new access services to be provided to said users, while said congestion limit is exceeded by the level of said data currently undergoing transmission, by:
- c. reducing the rate of handling of at least a portion of said data currently undergoing transmission when said first indication is produced; and
- d. increasing the rate of transmission of said portion of data currently undergoing transmission when said second indication is produced;

wherein activation of said second indication is effectively timed relative to deactivation of said first indication in a manner ensuring stable operation of said station; and wherein said station is adapted to interact with said selected users to maintain synchronism between said selected users and said station when said rates of transmission are reduced and increased.

16. A method in accordance with claim 15 wherein said data currently undergoing transmission is routed through other stations remote from said station, and said station is adapted to maintain synchronism between said selected users and said other remote stations when said rates of transmission are reduced and increased.

17. A method in accordance with claim 16 wherein said station is located at a head end center of a cable television network supplying television signals to users of said station.

18. A method in accordance with claim 15 wherein said station is located at a transmission distribution node of a private network serving a business enterprise, and said station is maintained by said enterprise.

* * * * *